United States Patent [19]

Lai

[11] Patent Number: 5,361,647
[45] Date of Patent: Nov. 8, 1994

[54] BICYCLE HEAD TUBE ASSEMBLY

[76] Inventor: Yen-Pin Lai, No. 199, Wu Tung South Road, Pu Hsin Hsiang, Changhwa,

[21] Appl. No.: 130,695

[22] Filed: Oct. 4, 1993

[51] Int. Cl.[5] ............................................. B62K 21/14
[52] U.S. Cl. ..................... 74/551.2; 74/551.1; 280/279; 280/234
[58] Field of Search ................. 74/551.1–551.8; 280/279, 234, 281.1, 263

[56] References Cited

U.S. PATENT DOCUMENTS

| | | | |
|---|---|---|---|
| 461,356 | 10/1891 | Matern | 74/551.2 |
| 586,897 | 7/1897 | Godfrey | 74/551.3 |
| 1,051,773 | 1/1913 | Stevens | 74/551.2 |
| 1,424,695 | 8/1922 | Violet | 74/551.2 |
| 1,719,007 | 7/1929 | Gazda | 74/551.2 |
| 2,456,267 | 12/1948 | Gazda | 74/551.2 |
| 3,477,741 | 11/1969 | Ross | 74/551.3 |
| 4,745,872 | 5/1988 | Nakamura | 74/551.3 |
| 5,253,544 | 10/1993 | Allsop et al. | 74/551.2 |

FOREIGN PATENT DOCUMENTS

| | | | |
|---|---|---|---|
| 927972 | 5/1955 | Germany | 280/279 |
| 247291 | 4/1926 | Italy | 74/551.2 |

*Primary Examiner*—Vinh T. Luong
*Attorney, Agent, or Firm*—Varndell Legal Group

[57] ABSTRACT

A bicycle head tube assembly includes a connecting device connected between a handlebar lug thereof and a head tube thereof to absorb shocks, the connecting devices comprised of a soft covering and a stack of resilient steel plates covered within the soft covering, the resilient steel plates including a fixed steel plate at the top having two opposite ends welded to the lug and the head tube respectively, and stack of suspension steel plates alternatively welded to the lug or the head tube and having a respective free end spaced from the lug or the head tube at a distance.

3 Claims, 3 Drawing Sheets

BICYCLE HEAD TUBE ASSEMBLY

BACKGROUND AND SUMMARY OF THE INVENTION

The present invention relates to a bicycle head tube assembly which effectively prevents transmission of shock waves from the front wheel of the bicycle to the handlebar.

The head tube of a conventional bicycle, as shown in FIG. 1, is generally comprised of a lug 51 connected to the head tube body 52 thereof by an unitary connecting tube 53 to hold the handlebar. As the bicycle runs over the rugged road, shock waves are directly transmitted from the bicycle frame to the handlebar, causing the hands to ache.

The present invention has been accomplished to provide a bicycle head tube assembly for a bicycle 15 which effectively eliminates transmission of shock waves to the handlebar during the running of the bicycle so that the rider's hands do not ache. According to the preferred embodiment of the present invention, the connecting device which connects the handlebar mounting lug to the head tube is comprised of a stack of resilient steel plates. The stack of resilient steel plates include a fixed steel plate at the top having two opposite ends welded to the lug and the head tube respectively, and a stack of suspension steel plates alternatively welded to the lug or the head tube and having a respective free end spaced from the lug or the head tube at a distance.

As the bicycle runs over a rugged road, the suspension steel plates are shaken to vibrate, and therefore shock waves are eliminated or lessened.

DETAILED DESCRIPTION OF THE PREFERRED EMBODIMENT

Figure 1:
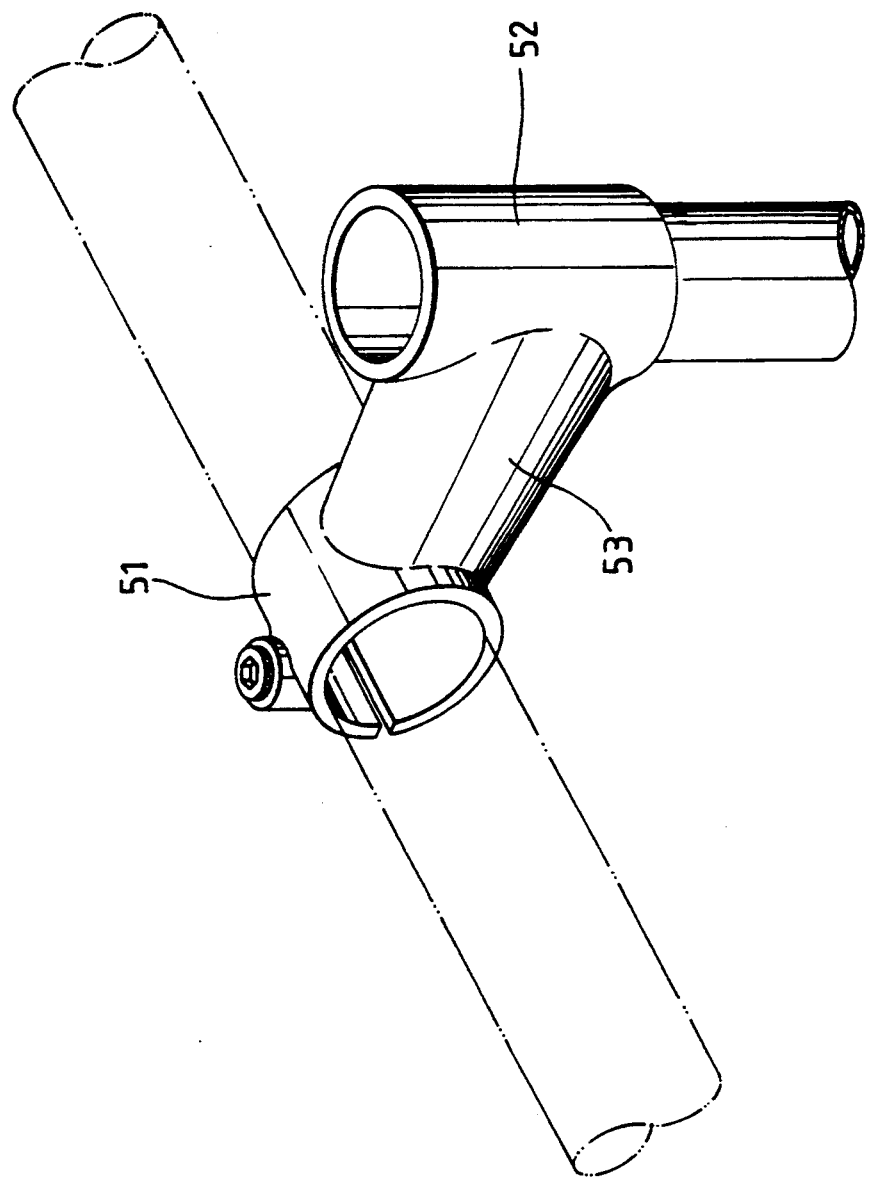
FIG. 1 is an elevational view of a bicycle head tube according to the prior art.
Figure 2:
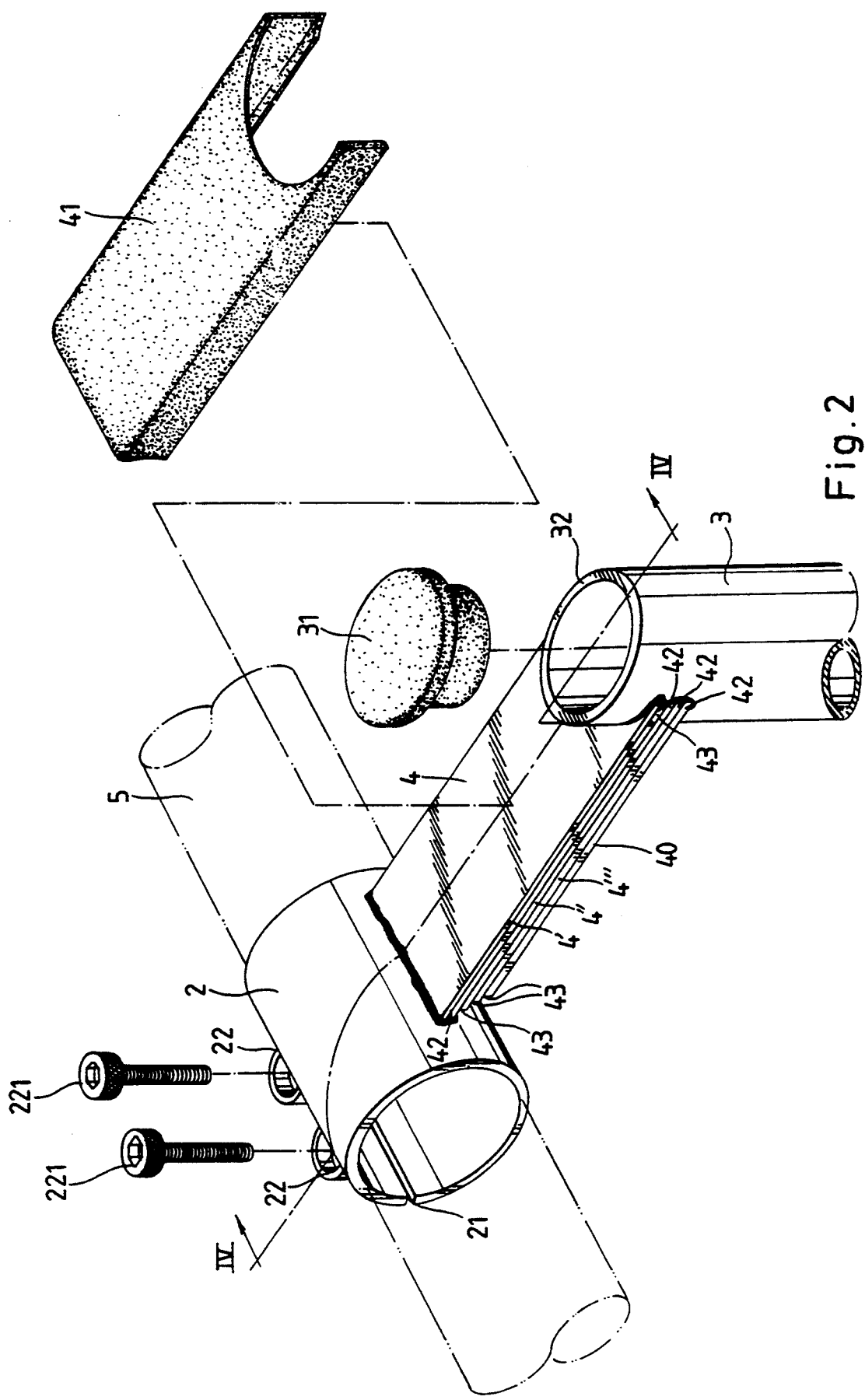
FIG. 2 an exploded view of bicycle head tube assembly according to the preferred embodiment of the present invention.
Figure 3:
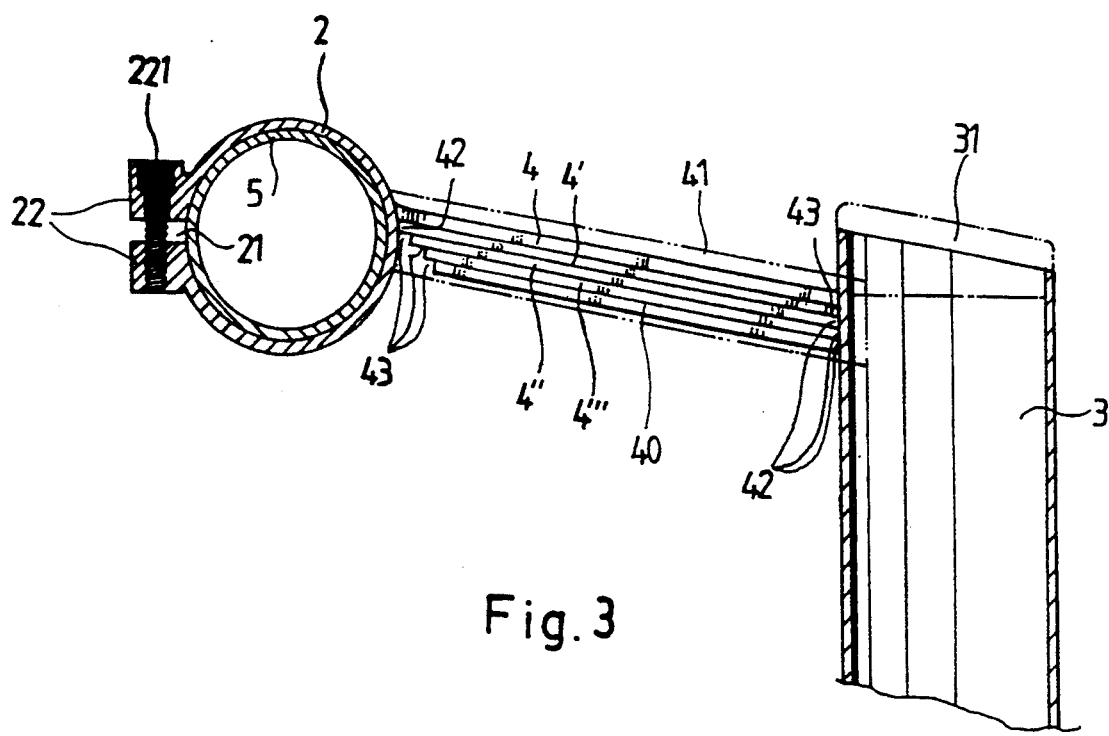
FIG. 3 is a cross-sectional view of the bicycle head tube assembly of FIG. 2 taken along line IV—IV.
Figure 4:
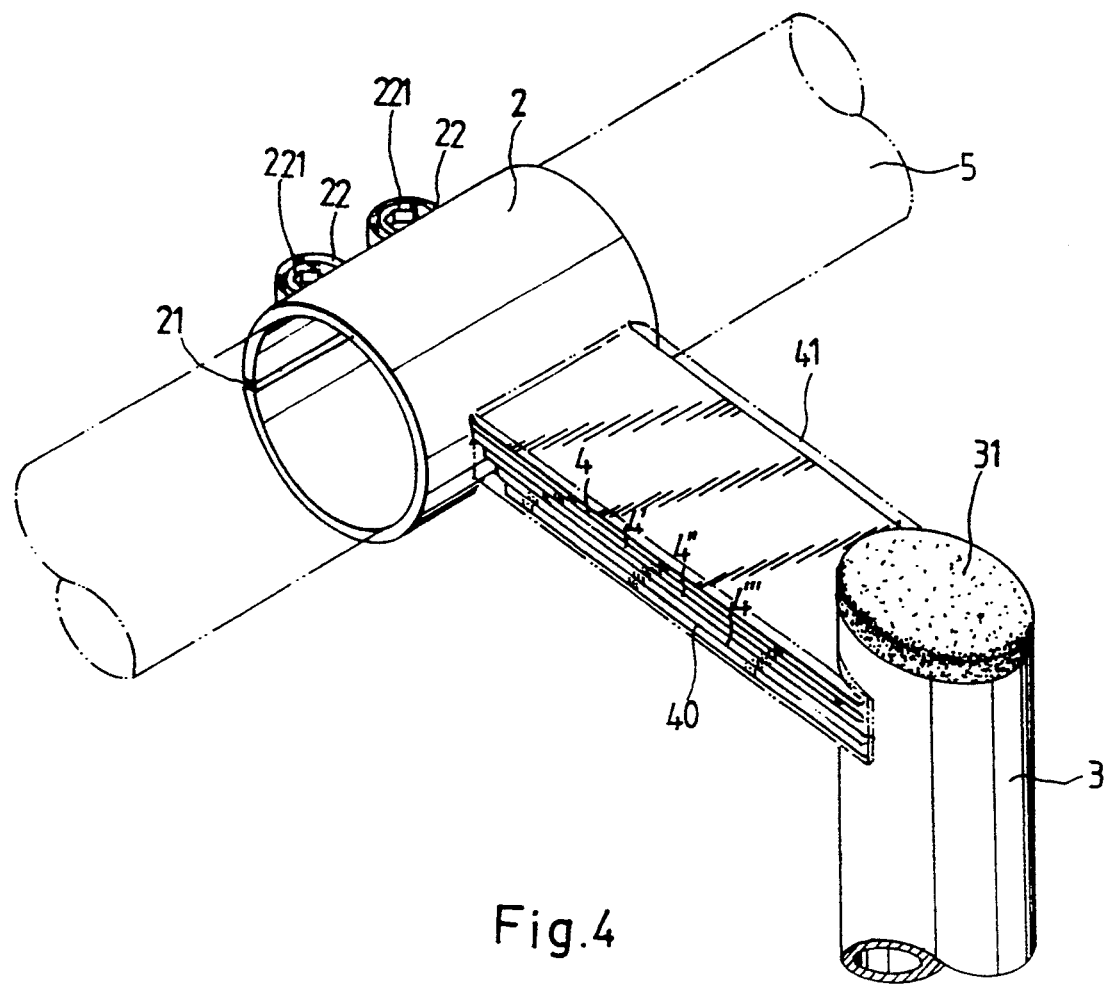
FIG. 4 is an elevational view of the bicycle head tube assembly of FIG. 2.

Referring to FIGS. 2, 3 and 4, a bicycle head assembly in accordance with the present invention is generally comprised of a horizontal lug 2, a head tube 3, and a connecting device connected between the horizontal lug 2 and the head tube 3. The horizontal lug 2 comprises two opposite pairs of barrels 22 at two opposite sides of a split 21 thereof. The pairs of barrels 22 are connected by respective screw bolts 221 after the handlebar 5 is inserted through the lug 2, and therefore the handlebar 5 is connected to the head tube 3. The head tube 3 has a sloping top edge 32 sealed by an end cap 31. The bottom end of the head tube 3 is connected to the front forks (not shown). The connecting device which connects the lug 2 to the head tube 3 is consisted of a stack of resilient steel plates 4; 4'; 4''; 4'''; 40, covered within a soft covering 41. The top steel plate 4 has two opposite ends respectively welded at 42 to the lug 2 and the head tube 3. The other resilient or suspension steel plates 4'; 4''; 4'''; 40 are alternatively welded to the lug 2 at 42 or the head tube 3 at 42, having a respective free end spaced from the lug 2 or the head tube 3 at a distance 43. As shock waves are transmitted from the head tube 3 to the connecting device, the steel plates 4';, 4''; 4'''; 40 are caused to shake except the top steel plate 4, and therefore shock waves are lessened or eliminated.

I claim:

1. A bicycle head tube assembly comprising a horizontal lug for holding a handlebar, a head tube, and a connecting device connected between said horizontal lug and said head tube; said connecting device including a stack of resilient steel plates, said stack of resilient steel plates including a top steel plate and a plurality of suspension steel plates arranged below said top steel plate, said top steel plate having one end welded to said horizontal lug and another end welded to said head tube; said suspension steel plates each having an attached first end and a free second end with said first end welded to one of said horizontal lug and said head tube and said second end unattached to and arranged at a distance from another one of said horizontal lug and said head tube, provided that at least one of said first ends is welded to said horizontal lug and another of said first ends is welded to said head tube.

2. The bicycle head tube assembly of claim 1, further comprising a cover covering said stack of resilient steel plates and extending a length thereof.

3. The bicycle head tube assembly of claim 1, wherein an uppermost of said suspension plates has said first end thereof welded to said horizontal lug and other of said suspension plates have said first ends thereof welded to said head tube.

* * * * *